United States Patent [19]

Lykes et al.

[11] Patent Number: 5,076,762
[45] Date of Patent: Dec. 31, 1991

[54] VERTICAL SUMP PUMP MOTOR

[75] Inventors: Robert E. Lykes, Troy; Norman R. Long, Tipp City, both of Ohio

[73] Assignee: A. O. Smith Corporation, Milwaukee, Wis.

[21] Appl. No.: 476,165

[22] Filed: Feb. 7, 1990

[51] Int. Cl.$^5$ ............................................. F04B 17/02
[52] U.S. Cl. ...................................... 417/40; 310/59; 417/360; 417/423.15; 417/424.1
[58] Field of Search ...................... 417/40, 360, 423.14, 417/423.15, 423.3, 424.1; 310/58, 59, 62, 63, 88, 89, 68 E, 157

[56] References Cited

U.S. PATENT DOCUMENTS

| | | | |
|---|---|---|---|
| 1,470,081 | 10/1923 | Huntting | 417/424.1 |
| 2,930,325 | 3/1960 | Beard et al. | 417/423.15 |
| 3,134,333 | 5/1964 | Nielsen | 417/423.3 |
| 3,407,739 | 10/1968 | Myers | 417/423.14 |
| 3,837,767 | 9/1974 | Aller | 417/423.14 |
| 4,877,984 | 10/1989 | Colwell et al. | 417/360 X |
| 4,885,440 | 12/1989 | Kachuk | 310/68 E X |
| 4,904,166 | 2/1990 | Wasemann | 417/360 |

FOREIGN PATENT DOCUMENTS 1259710 1/1968 Fed. Rep. of Germany ...................... 417/423.15

Primary Examiner—Stephen M. Hepperle
Attorney, Agent, or Firm—Andrus, Sceales, Starke & Sawall

[57] ABSTRACT

An adaptor assembly for a motor permits mounting to a pump to form a sump pump unit. A motor main frame has its end by end bearing frames. The adaptor assembly includes top and bottom plate adaptors formed of cast plastic or aluminum, and are separately inventoried for connection to a line of motors built for other applications as well as sump pumps. The bottom adaptor plate is secured to the end frame, with the motor shaft projecting concentrically of a hub extending from the plate. The hub telescopes over a tubular pedestal of the pump and has a collapsing collar for mounting the motor to the pump with the pump shaft and motor shaft coupled by a mating slot and projection. The plate is secured to the motor by suitable edge securement clips or by self tapping screws passing through a plate opening and threaded into a hole in the end frame. A top adaptor unit has a plate similarly secured to the top end of said motor. A tubular skirt extends from the top plate over the motor frame with a flared skirt aligned with cooling openings in the main frame. A relay housing is integrally formed to the exterior side of said top adaptor plate and connects to a releasably covered terminal board opening. A current sensitive relay in the housing is connected in circuit to respond to current in the motor winding in response to a "run" current flow and open contacts in circuit to a start winding of the motor winding.

20 Claims, 4 Drawing Sheets

VERTICAL SUMP PUMP MOTOR

BACKGROUND OF THE PRESENT INVENTION

This invention relates to a vertical sump pump motor and particularly to a sump pump motor releasably interconnected to a bottom pump unit for operation in a liquid collection sump or well.

In dwellings and other building structures having basements, water accumulates around the base structure. Drainage systems are installed to direct the water into a well or sump formed in the basement floor. Motor-driven sump pump units are mounted in the sump with an appropriate inlet and an outlet pipe system for draining the water to a waste disposal, generally to the exterior of the building structure or to a common sewage collection system. A widely used motor-driven pump unit includes a lower disc-like pump structure adapted to rest on the floor of the sump. The housing includes an impeller and a bottom opening for sucking of the water into and through the pump unit to a vertical discharge pipe or hose. A central pedestal pipe projects upwardly, with a pump impeller shaft extending therethrough. An electric motor is mounted to the upper end of the pedestal pipe with a motor shaft fixedly coupled to the pump shaft. The motor is thus supported above the level of the accumulating water in the sump. Automated pumping is established with a conventional switch unit through a float responsive control. In one such system, a rod member is secured, generally to the supporting pedestal structure and the motor by suitable brackets to support the rod spaced outwardly of the motor. A float member is slidably disposed on the rod. A first switch actuator is located at a lower portion of the rod to support the float in spaced relation to the pump unit with the sump empty. A second switch actuator is coupled to the rod adjacent the upper portion thereof and spaced from the first switch actuator by a distance corresponding to the accumulated water in the sump at a selected maximum level. As the water accumulates in the sump, the float rises and at the maximum level engages and actuates the switch unit. The actuation of the switch unit energizes the motor to pump the water from the sump to the waste or disposal location. The float drops with the level of the discharged water. The motor operates until the water level drops to the lower level, generally corresponding to an essentially empty sump, and the float actuates the first switch actuator to turn off the motor. Motors are generally specially constructed to operate in the environment of the sump, with the motor frame specially constructed for mounting to the pump unit and with a closed construction adapting the motor for sump pump operation.

The standard pump motor generally includes a special start winding which is selectively connected in circuit during the starting of the motor and is automatically disconnected from the motor circuit as the motor reaches or approaches normal operating speed. A centrifugal governor or actuator unit is mounted as an integrated part within the motor for centrifugal actuation of a mechanical switch as the motor approaches the desired running speed such that the motor continues to operate thereafter with only the run winding energized.

The present inventors realized that the sump motors could advantageously be constructed using a standard fractional horsepower motor widely used in various appliance and other applications. Such mass produced motors provide a most economical motor construction, and fabrication process, and have a more substantial size; giving an impression of a more substantial and powerful motor than that generally supplied with a conventional sump pump unit. The fractional horsepower motors however are generally constructed with the usual ground main frame, generally using a standard No. 48 frame, with end closure members such as closure or bearing frames and with the shaft projecting from one end. Mass produced fractional horsepower motors for various applications, appliances and the like may be constructed with two phase windings including a start winding and a run winding. The motor start with energizing of both windings and the motor control often includes a current sensitive relay to open the circuit to one phase after the motor approaches or reaches the running speed. The standard motor is not constructed for mounting to a sump pump unit, and particularly may not include a centrifugal switch or governor structure. Although the end frame structures could be specially constructed in accordance with the conventional sump pump motors, the advantages associated with mass production and the attendant cost factor would be minimized. The inventors realize therefore that there is a need for a special construction for fractional horsepower motors which adapts them to a sump pump application while maintaining the economy of construction associated with the standard fractional horsepower motors.

SUMMARY OF THE PRESENT INVENTION

The inventors realized that a particular adaptor structure could be economically constructed and inventoried for addition to the conventional mass produced fractional horsepower motor and for interconnection to the pump unit to form a highly effective and low cost sump pump unit for operations in a sump or the like. The present invention is particularly directed to motor adaptors for a fractional horsepower motor, and particularly a combination of special top and bottom end adaptors particularly for adapting a mass produced fractional horsepower motor to a sump pump unit. Generally, in accordance with the present invention, a special base or bottom mount adaptor is provided including a mounting structure for interconnection to the shaft end member of the standard motor and for releasable fixed interconnection at the shaft end of the motor. The adaptor in one embodiment includes a plate member overlying the adjacent end bearing frame and a central hub portion telescoped and concentric to the motor shaft. The hub is specially constructed for direct interconnection to a pedestal pipe of a standard sump pump unit. The lower end of the hub, in one embodiment, is collapsible to telescope over the pump pedestal with a collapsing collar fixedly securing the hub as an extension of the pump pedestal. Mounting clips or self tapping mounting screws advantageously interconnects the adaptor plate to the end of the motor. The mounting clips may be known L-shaped clips which fit over the motor main frame and the adaptor plate and have clip ends fitted into a securement opening in the frame and adaptor plate. Alternatively, the mounting screws pass through the adaptor plate and thread into openings in the motor end frame. The adaptor plate may also be bolted to the motor using the thru-bolts used to interconnect the end bearing frames to the main frame of the motor. The adaptor is thereby fixed to the motor for mounting of the motor to the sump pump, in accordance with a known connecting practice. In addition, a top adaptor is similarly or otherwise secured to the upper closed end of the fractional horsepower motor. The top adaptor may be specially constructed as a plate to overlie the upper end of the motor with a depending skirt to provide a drip shield over the motor which prevents entrance of water and other foreign matter into the interior of the motor frame through cooling openings in the adjacent end of the motor. The top adaptor plate in a preferred construction includes a flared skirt spaced outwardly of the main frame and telescoped over the upper cooling openings. Further, in a preferred embodiment, a terminal block chamber is also provided within the top plate, within which the motor winding is connected to the incoming power cable. In one embodiment of the invention, the top adaptor is further specially constructed with a separate relay housing or enclosure within which a control relay unit is secured. The relay unit is a current sensitive relay adapted to selectively actuate a set of relay contacts in accordance with the current flow through the relay. The relay enclosure opens into the terminal block chamber and is connected in circuit with the motor winding, and in particular has a current sensitive winding connected in series with the run winding and a set of contacts connected in circuit with the start winding. A conventional or standard float system or other water sensing system is coupled to the unit to start the motor in accordance with known practice. Once started, the motor continues to operate with both the run or start winding energized. As the motor approaches running speed, the current through the relay actuates the relay to open its contacts and disconnect the start winding from the circuit. The fractional horsepower motor continues to operate to discharge the sump and is de-energized at that point to recycle. The relay housing is conveniently integrally formed with the top adaptor plate and is of course provided with an appropriate sealed access opening for connecting, servicing and monitoring of the relay operation.

The top and bottom adaptors are conveniently mass produced at minimal cost, with a corresponding effective and reliable interconnection to a fractional horsepower motor.

The present invention thus provides a means for conveniently and economically converting a standard mass produced fractional horsepower motor to a sump pump unit. The adaptors can be inventoried for use with the standard inventoried motors, thereby minimizing the expense associated with separately inventorying sump pump motors and contributing to effective competitive commercialization in the highly competitive field of sump pump systems.

BRIEF DESCRIPTION OF THE DRAWING

The drawing furnished herewith illustrates the best mode presently contemplated by the inventors for carrying out the invention.

In the drawing.

DESCRIPTION OF THE ILLUSTRATED EMBODIMENT

Figure 1:
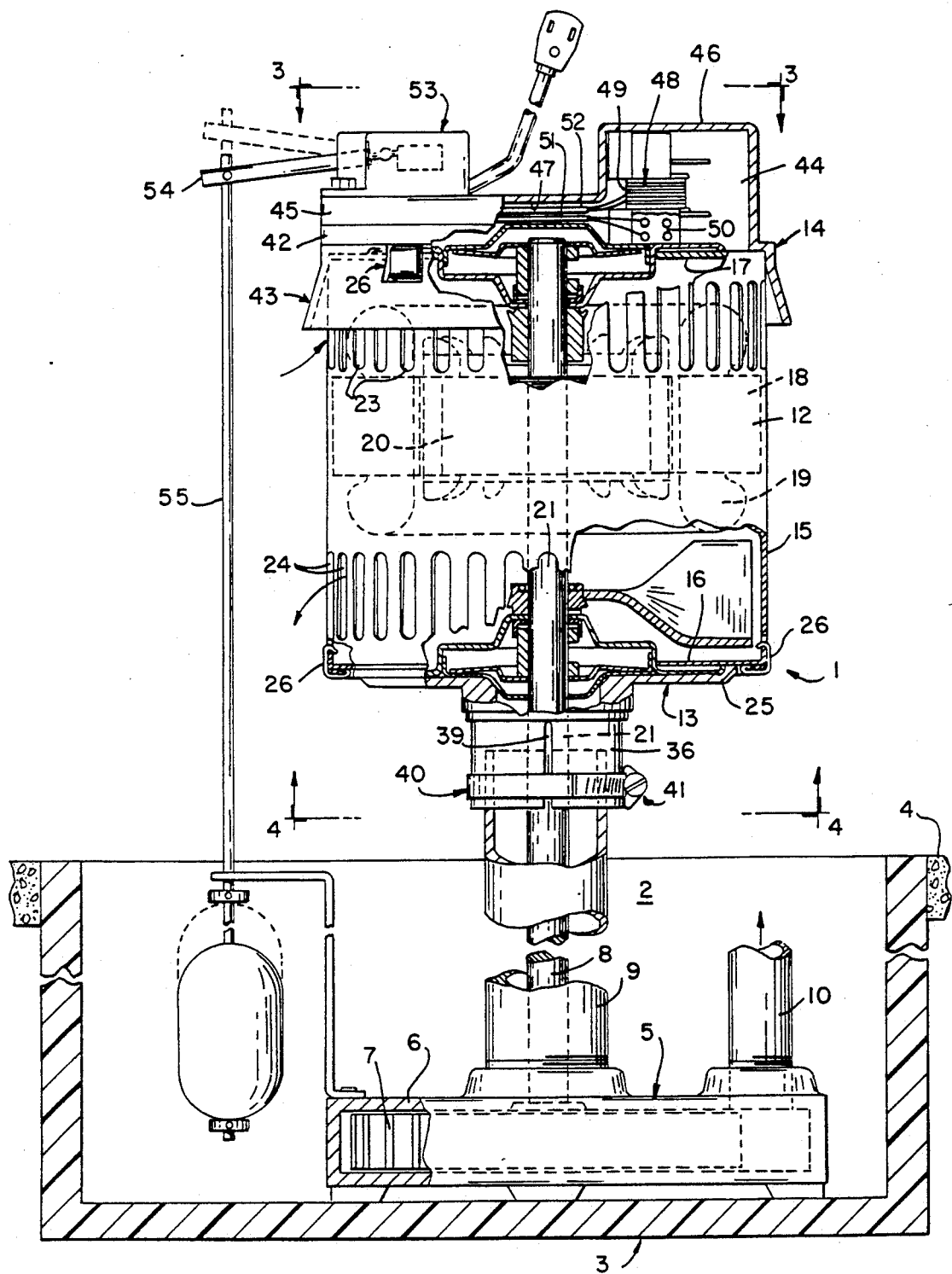
FIG. 1 is an elevational view of a sump pump unit mounted within a sump with parts broken away and sectioned.

Referring to the drawing and particular to FIG. 1, a motor-driven sump pump unit 1 is illustrated within a sump 2. A fragmentary portion of a dwelling or other building structure 3 is illustrated. The sump 2 is formed as an open top well in the floor 4 of the structure. The sump pump unit 1 includes a pump 5 resting on the bottom of the sump 2. The pump 5 is illustrated as a conventional pump having an outer cast housing 6 with suitable short leg members adapted to support the pump on the flat bottom wall of the sump. The pump housing 6 is a shallow dished member or housing structure within which a pump impeller 7 is rotatably mounted, with a drive shaft 8 projecting upwardly through a suitable bearing, not shown, in the top wall of the housing. A motor pedestal, shown as a pipe 9, is secured to the top housing wall and projects upwardly in concentricity with the pump impeller shaft 8. A vertically upstanding pipe 10 is secured to the periphery of the housing for discharge of the water from the sump and transport through a suitable housing or piping unit, not shown, to a waste disposal location to the exterior of the building structure. The pump 5 is shown in accordance with a generally typical construction which is manufactured and sold by a number of different manufacturers. A motor 12, specially constructed in accordance with the teaching of this invention, is secured to the upstanding pedestal pipe 9 on the pump 5 and is supported by the pump. In accordance with the present invention, the motor 12 is a standard fractional horsepower motor with a special sump pump adaptor assembly including a bottom adaptor 13 and a top adaptor 14, each specially provided and constructed to adapt the motor 12 for operation in the environment of a sump pump unit. The fractional horsepower motor 12 includes a cylindrical main frame 15 enclosed at the opposite ends in end bearing frames 16 and 17. In accordance with known constructions, a stator unit 18 is secured within the main frame 15 having winding 19 which includes a run winding and a start winding. A rotor 20 is rotatably mounted within the stator unit 18 with its shaft 21 supported by bearings located in the respective end bearing frames 16 and 17. The shaft 21 terminates within the upper bearing frame 17. The opposite end of the shaft 21 extends outwardly from the corresponding bearing frame 17 for interconnection to the pump shaft 9, as more clearly shown in FIGS. 2 and 3. The main frame 15 has top and bottom side openings 23 and 24 to allow cooling air flow through the motor. The motor may include a fan unit mounted within the motor to establish forced cooling of the motor. A suitable motor structure with an internal fan is illustrated in the copending application of James L. King et al entitled "Multiple Compartmented Dynamoelectric Machine" filed on Oct. 26, 1989 with Ser. No. 07/427,441.

The present invention is particularly directed to the provision of the adaptor assembly and its construction to convert a standard mass produced fractional horsepower motor 12 to application in a sump pump unit. The pump 5 and motor 12 may be constructed in accordance with any desired or known construction and such structures are not further described other than as necessary to fully explain and describe the illustrated embodiment of the invention.

Figure 2:
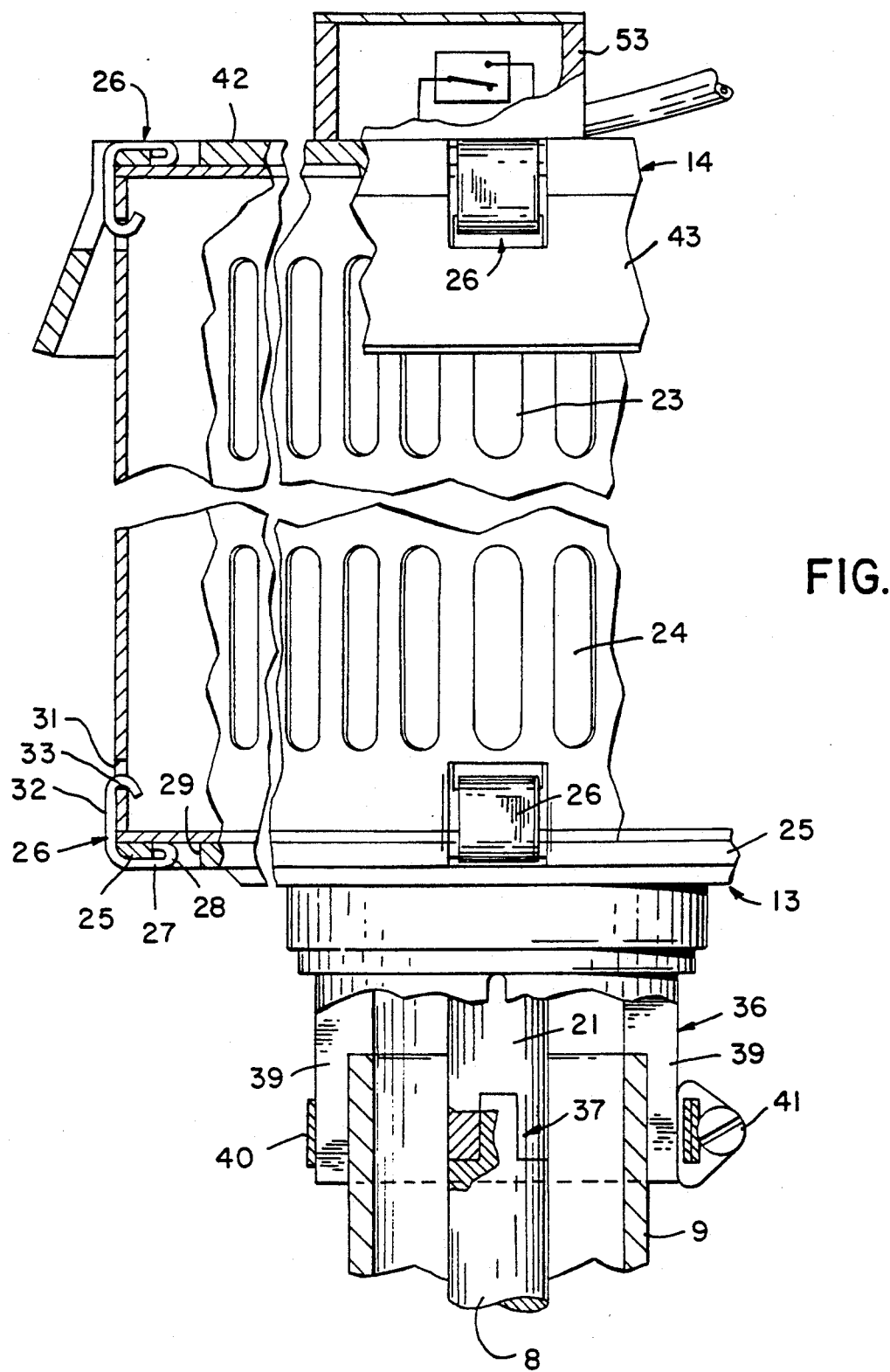
FIG. 2 is an enlarged fragmentary elevational view of the motor and adaptor units illustrating one embodiment of the present invention and shown partly in section for illustrating certain detail of construction.
Figure 3:
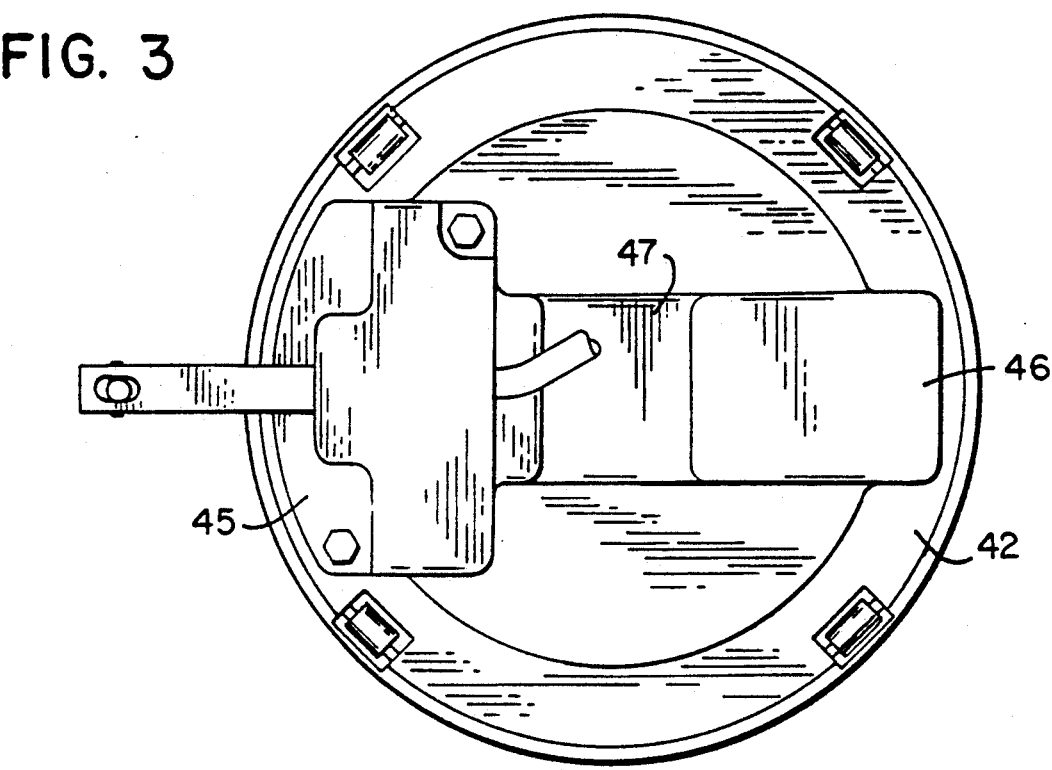
FIG. 3 is a horizontal section taken generally on line 3—3 of FIG. 1 and illustrating the bottom adaptor structure.
Figure 4:
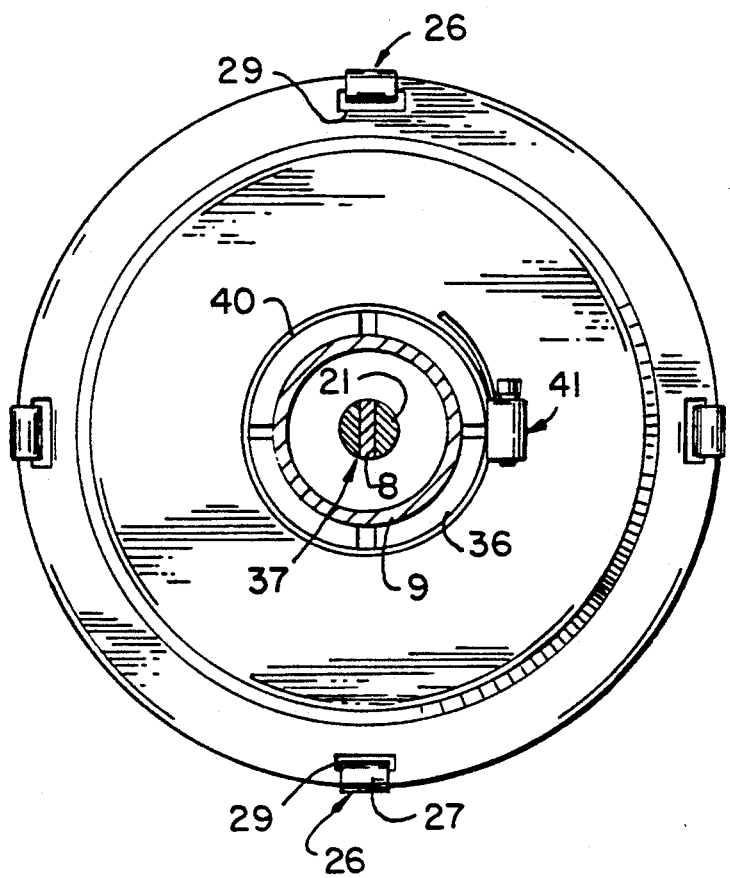
FIG. 4 is an enlarged vertical section taken on line 4—4 of FIG. 1.

Referring particularly to FIGS. 2 and 3, the bottom adaptor 13 of the sump pump adaptor assembly includes a mounting plate 25 having an outer diameter essentially corresponding to and complementing the diameter of the main frame 15 and end frame 16 of the fractional horsepower motor 12. The plate 25 is specially formed with edge abuttments engaging the lower end frame of the motor. The plate 25 is shown secured with the end frame 16 to the main frame 15 of the motor by attachment clips 26. As shown most clearly in FIGS. 2 and 3, each clip 26 is illustrated as a known Timmerman clip presently used to secure a bearing frame to the main motor frame. Generally, each clip 26 is a small L-shaped metal clip having one arm 27 terminating in an inwardly projecting lip or hook 28. The plate 25 is provided with an opening 29 spaced inwardly from its edge, in accordance with the length of the clip arm 27. The hook 28 mates with the opening 29 extends over the plate 25 and frame 16 at the opening to secure them in engagement against the main frame 15. The arm 27 extends outwardly to the outer edge of the end bearing frame 16. The main frame 15 is provided with an opening 31 spaced inwardly from the end of the main frame by the distance of the second arm 32 of the clip 26. The opposite clip arm 32 terminates in a lip or hook 33 and is similarly secured to the main frame. The hooks 28 and 33 of clip 26 may be formed with inner narrowed and stepped ends, for ease of assembly or the like. The clip 26 is formed of a suitable resilient metal to firmly locate and hold the hooks in engagement with the openings and thereby firmly and reliably interlock the adjacent adaptor plate to the motor.

The center portion of the bottom adaptor plate 25 includes an integral interconnecting hub 36 projecting downwardly, concentric with the motor shaft 21. The hub 36 is precisely centered on the motor to establish a concentricity with the motor shaft 21 which extends through hub 36 with a slot and projection coupling 37 to pump shaft 8. The outer end of the hub 36 is specially constructed for interconnection with the upstanding pedestal pipe 9 of the pump 5. Thus, with the bottom adaptor assembly 13 and particularly plate 25 fixedly attached to the motor frame 15, and the adaptor hub 36 interconnected to the pipe 9, the motor 12 is mounted in appropriate and proper relation for operation of the pump 5.

The hub 36 is constructed in accordance with the illustrated embodiment for telescoped and clamped securement to the pedestal pipe 9. The hub 36 is therefore preferably formed of a suitable plastic and formed with a longitudinal opening or slot 39 in the outer end. The hub 36 is shown telescoped with the pedestal pipe 9. A hose clamp 40 encircles the slotted hub end and includes a tightening screw unit 41, or other collapsing member, to force the hub 36 into liquid tight engagement with the pedestal pipe 9. The hub 36 may also be formed of aluminum or other materials with a clamp unit providing sufficient force to compress and establish a firm attachment to the pedestal pipe.

The upper adaptor 14 is specially constructed for similar mounting to the upper end of the motor. The adaptor 14 includes a covering plate 42 secured to the upper end of the motor 11 in a manner corresponding to that shown for attachment of the bottom mounting plate 25 including clips 26. The top adaptor plate 42 is formed as an essentially continuous uninterrupted plate member having an outer lip or skirt 43 which extends downwardly over the upper end of the main frame 15. The lower portion of skirt 43 extends over the cooling openings 23 in the main frame 15 and is flared outwardly to allow for movement of air into and from the cooling openings 23 in the main frame 15 in accordance with the designed air flow through the motor. When clamped in place, the adaptor plate 42 provides a protective covering over the upper end of the motor 12 and particularly openings 23 preventing entrance of moisture and other foreign matter into the motor compartment.

The top adaptor plate 42 is further specially formed with a relay chamber 44 an a terminal or 5 connection chamber 45 on the top side of the plate 42. The relay chamber 44 is shows as an inverted cup-shaped housing 46 with a lateral connecting portion 47 to the connection chamber 45. The relay chamber 44 and connection chamber 45 opens directly to the end frame 17 and provides for connection of the motor winding 19 into circuit, in accordance with any known or suitable connection, not shown. A current responsive relay 48 is mounted to the upper bearing frame 17 and enclosed by the chamber 44. The relay 48, is shown diagrammatically in FIG. 2, includes a winding unit 49 coupled through a suitable magnetic structure to open and close a switch unit 50. Leads 51 between chambers 45 and 46 interconnect the switch unit 50 into circuit with the start section of the motor winding 19. The relay winding 49 has its leads 52 interconnected in circuit connection with the run section of the winding. Thus, upon starting of the motor, current flows through the relay winding 49. At a selected current level, the relay 48 opens the switch unit 50 and disconnects the start winding The motor operation continues under the energization of the run winding in accordance with known practice.

In the illustrated embodiment of the invention, the top plate 42 has a suitable float actuated switch 53 mounted to close chamber 45. A switch arm 54 is provided on switch 53 for coupling to a typical float rod 55 to provide for appropriate actuation of the float actuated switch 53 with changes in the water level. Switch 53 includes a mounting base bolted to the plate 42 and is releasably mounted as by bolts 53a and particularly chamber 45 with a sealing gasket therebetween. A typical switch unit is available commercially from Arrow Hart, with Model #84594.

The embodiment of FIGS. 1-4 thus converts a standard motor 2 having a start winding selectively connected in circuit via relay 48 to the special requirements for direct coupling in a sump-pump unit.

Although the clip connectors 26 provide a reliable and inexpensive connection of the adaptor unit to the motor, other systems may be used.

Figure 5:
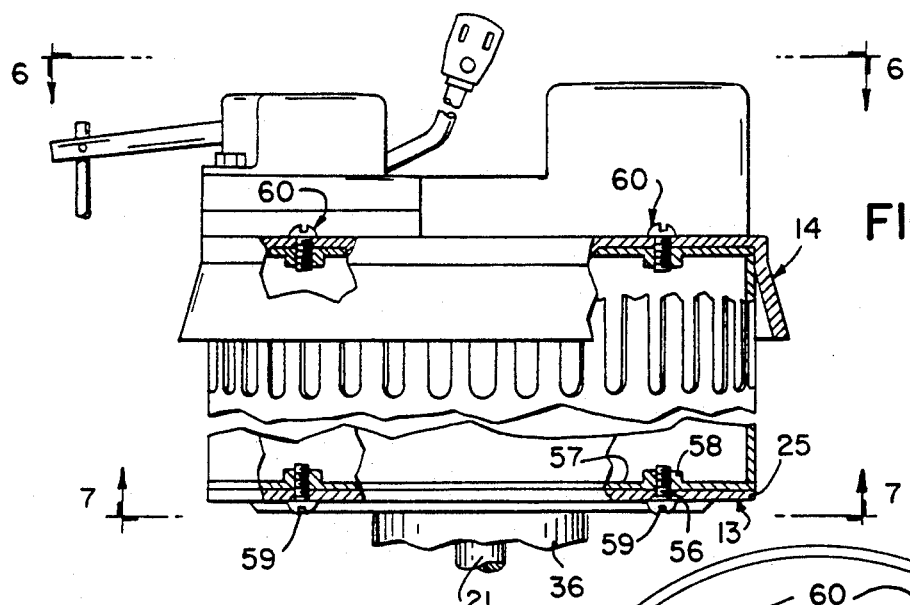
FIG. 5 is a plan view of the top adaptor unit with parts broken away and sectioned to show detail of construction.
Figure 6:
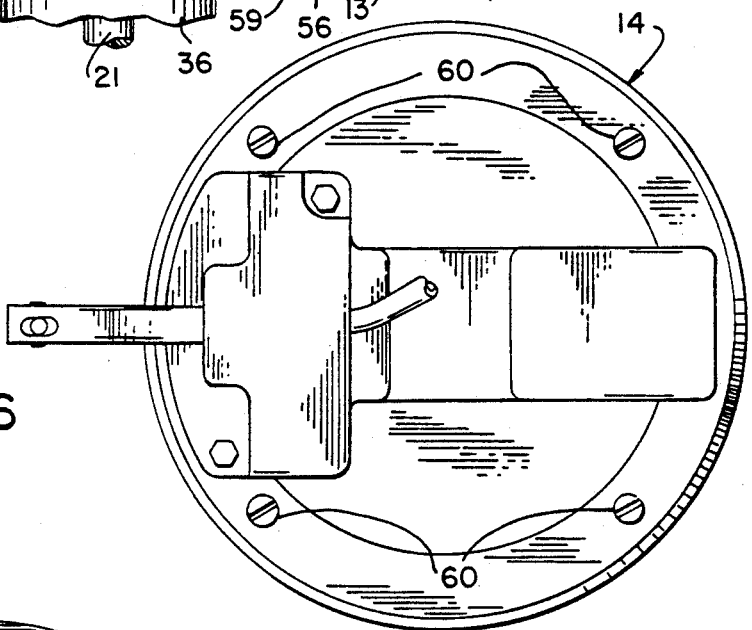
FIG. 6 is a fragmentary side view of a motor showing an alternate embodiment of the top adaptor unit, with parts broken away and sectioned to show detail of construction.
Figure 7:
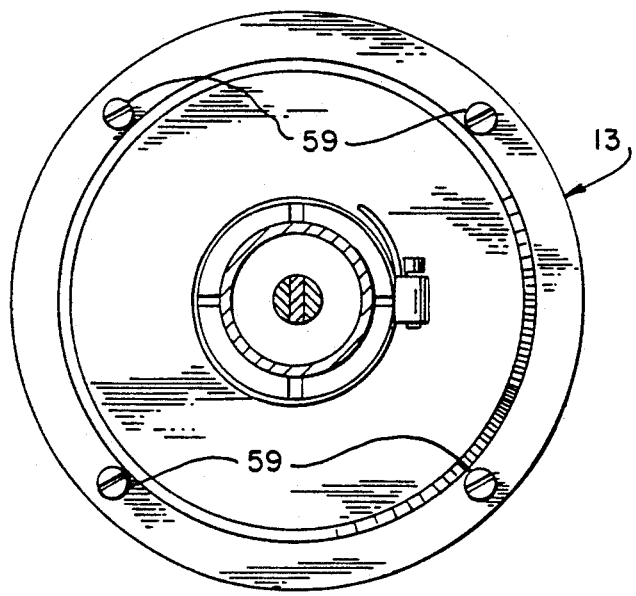
FIG. 7 is a top plan view of the motor shown in FIG. 5.

A particularly simple and reliable alternative is shown in FIGS. 5-7 inclusive. For simplicity and clarity of description, the corresponding elements in the first and second embodiments are similarly membered.

Referring to FIGS. 5 and 6 and particularly the bottom adaptor unit 13, the plate 25 has circumferentially spaced attachment openings 56 located inwardly of the edge and aligned with a structural wall 57 of the end bearing frame 16. The end bearing frame 16 is formed with circumferentially spaced openings 58 in its wall 57, with the openings 58 spaced and aligned with opening 56. Self-tapping threaded screws 59 are passed through the adaptor openings 56 and threaded into the end frame openings 58 to securely lock the adaptor plate 25 in place. Four screws 59 are shown in the illustrated embodiment. At least two screws 59 will be provided, but additional spaced screws are preferably used.

The top adaptor unit 14 is similarly secured to the top end frame by screws 60. The various methods of interconnecting the frame are illustrated for purposes of explanation and description. Other systems may be used. For example, in motors having the end frames secured by standard thru-bolts which project through the motor and the end frames, the bolts may be lengthened to pass through appropriate aligned openings in the adaptor plates and end frame of the motor. Each system firmly and reliably interlocks the adaptor unit to the standard main motor structure.

The top and bottom adaptor members 13 and 14 are illustrated in preferred constructions, but may be formed of any suitable construction to provide the direct coupling of a suitably enclosed completed motor to the pedestal and to provide the necessary protection and shielding of the upper end of the motor. The top and bottom adaptor plate units 13 and 14 can be formed in any suitable manner and are readily cast of a suitable plastic, cast aluminum on other appropriate material. Such construction establishes a convenient and low cost mass production of the components which can be appropriately inventoried for direct connection to the standard fractional horsepower motor. The interconnection of the adaptor plates is convenient, effective and fast and particularly adapts the system to commercial mass production and fabrication of sump pump units as required from the inventory of motors massed produced for other applications as well as the sump pump units.

Various modes of carrying out the invention are contemplated as being within the scope of the following claims particularly pointing out and distinctly claiming the subject matter which is regarded as the invention.

We claim:

1. A motor unit particularly adapted for connection to a sump pump casing having an upstanding mounting pedestal comprising a fractional horsepower motor having a cylindrical main frame having an upper open end and a lower open end and closed at the lower open end by a first end member and at the upper open end by a second end member and including a motor shaft extending from said first end member, a pump mount adaptor assembly including a bottom adaptor, said bottom adaptor being a plate-like member adapted to be releasably secured to said motor in overlying and immediately adjacent relationship to said first end member and having an outer edge potion substantially aligned with said main frame, attachment means connected to the bottom adaptor adjacent the outer edge of said first end member and coupled to the end of the main frame abutting said first end member, said plate-like member having a central tubular hub in concentricity with said motor shaft, said tubular hub having an end connection means for releasably interconnection to said pedestal for mounting of the moor in vertical orientation and in vertical spaced relation to said pump, and a top adaptor releasably secured to said second end member of said motor and including a continuous overlying member to form a shield over the uppermost end of said motor, said bottom adaptor and said top adaptor being spaced from each other and exposing a substantial length of said main frame.

2. The motor unit of claim 1, wherein said continuous overlying member includes a depending skirt telescoped over only an upper end portion of said motor.

3. The motor unit of claim 2, wherein said motor main frame includes cooling openings in overlapping relation to said skirt.

4. The motor unit of claim 3, wherein said skirt is flared outwardly in alignment with said cooling openings.

5. The motor unit of claim 1, wherein said motor includes a run winding and a stat winding, and said top adaptor includes a switch housing integrally formed to the exterior side of said overlying member and a terminal chamber having a relesably covered access opening, a current sensitive relay mounted within aid housing, connecting leads from said relay terminating in said terminal chamber, said relay having a current sensitive winding connected in series with said motor run winding to actuate said contacts in response to a current flow to said motor winding essentially corresponding to the motor running speed, said relay contacts being connected in circuit with the motor start winding to selectively open the connection to start the winding.

6. The motor unit of claim 1, wherein said motor includes a standard 48 motor frame.

7. The motor unit of claim 1, wherein said plate-like member is formed as a single integral plastic member.

8. The motor unit of claim 1, wherein said hub includes a slitted end sidewall establishing a collapsing sidewall.

9. The motor unit of claim 1, wherein said bottom adaptor is an integrally cast aluminum member.

10. The motor unit of claim 9, wherein said hub includes a slitted end sidewall establishing a collapsing sidewall.

11. The motor unit of claim 1, wherein said motor frame includes atop sidewall cooling openings, said top plate unit has an outer skirt projecting downwardly over the upper end of the motor to divert moisture and foreign matter to the exterior of said motor, said top plate unit includes an integral relay housing and a terminal chamber having a releasably covered access opening.

12. The motor unit of claim 11, wherein said skirt is flared outwardly in alignment with said sidewall openings.

13. A sump-pump unit, comprising a fractional horsepower motor including a standard 48 main frame and having first and second nd bearing members secured to the opposite ends of said frame to define an internal motor chamber, a rotor rotatably mounted within said chamber and including a shaft projecting from said first bearing frame and terminating within said second bearing frame, a pump adaptor plate secured to said first bearing end of said motor in abutting engagement with said first bearing frame and including a central tubular hub mounting member projecting axially concentrically with said motor shaft, an outer adaptor plate connected to the opposite end of said motor in abutting engagement with said second end bearing frame and telescoped over the main frame to establish a protective cover preventing entrance of foreign matter int said motor, a motor control reality secured within said outer adaptor plate and interconnected to said motor winding to selectively energize said motor winding in one condition during stating of said motor and in a second condition in response to said motor after predetermined starting of the motor thereof, and an enclosure forming an integrated pat of said outer adaptor plate and totally enclosing said relay unit, a float switch unit interconnected to said outer adaptor plate and including afloat coupler for coupling the switch unit to a float unit for controlling said sump-pump unit.

14. A motor unit particularly adapted for connection to a sump pump casing having an upstanding mounting pedestal, comprising a fractional horsepower motor having a cylindrical main frame having an upper open end and having a lower open end closed a the lower open end by a first end bearing frame and at the upper open end by a second end bearing frame and including a rotor shaft extending from said fist end bearing frame and terminating at the opposite end in said second end bearing frame, said motor being air cooled and including a sidewall cooling openings, a pump mounting adaptor unit adapted to be releasably secured to said motor adjacent said fist end bearing frame and in overlying relationship to said first end bearing frame, attachment means connected to the pump mounting adaptor unit adjacent the outer edge of said fist end bearing member and coupled to the end of the main frame abutting said fist end bearing member, said adaptor unit having a central connector member inconcenricity with said motor shaft, said connector member adapted for releasably interconnection to said pedestal for mounting o of the motor in vertical orientation and in vertical spaced relation to said pump, a top adaptor unit relesably secured to aid motor adjacent the second end bearing frame of said motor and including a continuous cover member having a depending portion extended partially downwardly over said cooling openings and forming a moisture and direct shield over the upper end of said motor, sand said adaptor units being spaced from each other and exposing said motor frame below said depending portion.

15. The motor unit o claim 14, wherein the motor includes a motor winding an having a run winding and a start winding and including a relay housing integrally formed to the interior side of said top adaptor cover member, relesably covered terminal chamber integrally formed in said top adaptor cover member adjacent said relay housing and connected thereto, a current sensitive relay mounted within said housing, connecting leads from said relay into said terminal chamber, said relay having a current sensitive winding connected in series with said motor run winding to actuate said contacts in response to a current flow to said motor winding, said relay having contacts being connected in circuit with the motor start winding to selectively open the connection to said start winding.

16. The motor unit of claim 15, wherein said skirt includes a first portion substantially complementing the main frame and a flared skirt portion flared outwardly from said fist portion.

17. The motor unit of claim 14, wherein said motor includes a standard 48 frame.

18. The motor unit of claim 17, including first and second L-shaped securement clips securing the adaptor to the motor main frame, said first L-shaped securement clips each having a first clip end secured to aid first end bearing frame and said adaptor unit and a second clip end secured to said motor frame, and said second L-shaped securement clips each having a first clip end secured to said second end bearing frame and said top adaptor unit and a second clip end secured to said main frame.

19. The motor unit of claim 14, including a plurality of fist securement units connecting the pump mounting adaptor unit to the adjacent end bearing frame and the top adaptor unit to the second end bearing frame, each securement unit including an opening in the adaptor aligned with an opening in said end frame and a self tapping screw passed through the adaptor opening and threaded into the frame opening.

20. The method of fabricating a sump pump unit, comprising fabricating a line of fractional horsepower motors each including a main frame and a first and second end frame member secured to the opposite ends of said main frame to define an internal motor chamber having a stator unit secured within the main frame and a rotor rotatably mounted within said chamber and including a shaft projecting from said first end frame member, fabricating a line of sump pump adaptor assemblies each including a bottom pump adaptor plate and a top adaptor, securing a bottom pump adaptor to said first end frame member of a motor and including a central hub member projecting axially with said motor shaft, forming said hub member as a collapsible tubular member, fixedly collapsing said tubular member to a pump pedestal with a pump shaft coupled to said motor shaft, fabricating a top adaptor with a cover plate and depending flared skirt, and securing the top adaptor to the opposite end of said motor with said flared skirt extended over the main frame to establish a protective cover preventing entrance of foreign matter into said motor.

* * * * *

UNITED STATES PATENT AND TRADEMARK OFFICE
CERTIFICATE OF CORRECTION

PATENT NO. : 5,076,762
DATED : December 31, 1991
INVENTOR(S) : ROBERT E. LYKES ET AL It is certified that error appears in the above-identified patent and that said Letters Patent is hereby corrected as shown below:

Col. 9. line 34, CLAIM 14, after "mounting" delete "o"; Col. 9, line 36, CLAIM 14, delete "relesably" and substitute therefor ---releasably---; Col. 9, line 37, CLAIM 14, delete "aid" and substitute therefor ---said---; Col. 9, line 41, CLAIM 14, delete "direct" and substitute therefor --dirt--; Col. 9, line 42, CLAIM 14, delete "sand" and substitute therefor ---and---; Col. 9, line 45, CLAIM 15, delete "o" and substitute therefor ---of---; Col. 9, line 45, CLAIM 15, delete "an" and substitute therefor ---and---; Col. 9, line 49, CLAIM 15, delete "relesably" and substitute therefor ---releasably---; Col. 10, line 10, CLAIM 16, delete "fist" and substitute therefor ---first---; Col. 10, line 12, after "48" insert ---motor---; Col. 10, line 17, CLAIM 18, delete "aid" and substitute therefor ---said---; Col. 10, line 24, CLAIM 19, delete "fist" and substitute therefor ---first---.

UNITED STATES PATENT AND TRADEMARK OFFICE
CERTIFICATE OF CORRECTION

PATENT NO. : 5,076,762
DATED : December 31, 1991
INVENTOR(S) : ROBERT E. LYKES ET AL It is certified that error appears in the above-identified patent and that said Letters Patent is hereby corrected as shown below:

Col. 7, line 61, CLAIM 1, delete "potion" and substitute therefor ---portion---; Col. 8, Line 1, CLAIM 1, delete "moor" and substitute therefor ---motor---; Col. 8, Line 19, CLAIM 5, delete "stat" and substitute therefor ---start---; Col. 8, line 22, CLAIM 5, delete "relesably" and substitute therefor ---releasably---; Col. 8, Line 23, CLAIM 5, delete "aid" and substitute therefor ---said---; Col. 8, Line 45, CLAIM 11, delete "atop" and substitute therefor ---top---; Col. 8, Line 45, CLAIM 11, after "said" insert ---continuous overlying member includes a---; Col. 8, line 46, CLAIM 11, delete "has" and substitute therefor ---and---;

UNITED STATES PATENT AND TRADEMARK OFFICE
CERTIFICATE OF CORRECTION

PATENT NO. : 5,076,762
DATED : December 31, 1991
INVENTOR(S) : ROBERT E. LYKES ET AL Page 3 of 5

It is certified that error appears in the above-identified patent and that said Letters Patent is hereby corrected as shown below:

Col. 8, lines 49-50, CLAIM 11, delete "top plate unit" and substitute therefor ---overlying members---; Col. 8, line 57, CLAIM 13, delete "nd" and substitute therefor ---end---; Col. 9, line 2, CLAIM 13, delete "int" and substitute therefor ---into---; Col. 9, line 3, CLAIM 13, delete "reality" and substitute therefor ---relay---; Col. 9, line 6, CLAIM 13, delete "stating" and substitute therefor ---starting---; Col. 9, line 9, CLAIM 13, delete "pat" and substitute therefor ---part---; Col. 9, Line 11, CLAIM 13, delete "afloat" and substitute therefor ---a float---;

UNITED STATES PATENT AND TRADEMARK OFFICE
CERTIFICATE OF CORRECTION

PATENT NO. : 5,076,762

DATED : December 31, 1991

INVENTOR(S) : ROBERT E. LYKES ET AL

It is certified that error appears in the above-identified patent and that said Letters Patent is hereby corrected as shown below:

Col. 9, Line 18, CLAIM 14, delete "a" and substitute therefor ---at---; Col. 9, line 21 CLAIM 14, delete "fist" and substitute therefor ---first---; Col. 9, line 26, CLAIM 14, delete "fist" and substitute therefor ---first---; Col. 9, line 29, CLAIM 14, delete "member" and substitute therefor ---first---; Col. 9, line 31, CLAIM 14, delete "fist" and substitute therefor ---first---; Col. 9, line 31, CLAIM 14, delete "member" and substitute therefor ---frame---; Col. 9, line 32, CLAIM 14, delete "inconcenricity" and substitute therefor ---concentricity---; Col. 9, lines 33-34, CLAIM 14, delete "releasably" and substitute therefor ---releasable---;

UNITED STATES PATENT AND TRADEMARK OFFICE
CERTIFICATE OF CORRECTION

PATENT NO. : 5,076,762

DATED : December 31, 1991

INVENTOR(S) : Robert E. Lykes et al

It is certified that error appears in the above-identified patent and that said Letters Patent is hereby corrected as shown below:

Col. 10, line 24, CLAIM 19, delete "fist" and substitute therefor --first--.

Signed and Sealed this

Twentieth Day of July, 1993

Attest:

MICHAEL K. KIRK

*Attesting Officer*     *Acting Commissioner of Patents and Trademarks*